United States Patent
Zhang et al.

(10) Patent No.: US 9,961,340 B2
(45) Date of Patent: May 1, 2018

(54) METHOD AND APPARATUS FOR VIDEO QUALITY MEASUREMENT

(75) Inventors: Fan Zhang, Hubei (CN); Ning Liao, Beijing (CN); Kai Xie, Beijing (CN); Zhibo Chen, Beijing (CN)

(73) Assignee: THOMSON Licensing, Issy-les-Moulineaux (FR)

( * ) Notice: Subject to any disclaimer, the term of this patent is extended or adjusted under 35 U.S.C. 154(b) by 349 days.

(21) Appl. No.: 14/364,144

(22) PCT Filed: Dec. 15, 2011

(86) PCT No.: PCT/CN2011/002096
§ 371 (c)(1),
(2), (4) Date: Jun. 10, 2014

(87) PCT Pub. No.: WO2013/086654
PCT Pub. Date: Jun. 20, 2013

(65) Prior Publication Data
US 2014/0334555 A1     Nov. 13, 2014

(51) Int. Cl.
| H04N 7/12 | (2006.01) |
| H04N 17/00 | (2006.01) |
| H04N 19/176 | (2014.01) |
| H04N 19/124 | (2014.01) |
| H04N 19/154 | (2014.01) |

(52) U.S. Cl.
CPC ......... *H04N 17/004* (2013.01); *H04N 19/124* (2014.11); *H04N 19/154* (2014.11); *H04N 19/176* (2014.11)

(58) Field of Classification Search
CPC .. H04N 17/004; H04N 19/176; H04N 19/154; H04N 19/124

USPC ........... 375/240.26, 240.27, 240.12, 240.16; 348/192; 386/224
See application file for complete search history.

(56) References Cited

U.S. PATENT DOCUMENTS

| 7,170,933 B2 | 1/2007 | Kouloheris et al. |
| 7,869,517 B2 | 1/2011 | Ghanbari |

(Continued)

FOREIGN PATENT DOCUMENTS

| CN | 1656823 A | 8/2005 |
| CN | 101895752 A | 11/2010 |

(Continued)

OTHER PUBLICATIONS

Davis et al., "Hybrid no-reference video quality prediction", IEEE International Symposium on Broadband Multimedia Systems and Broadcasting, 2009, BMSB '09, May 13-15, 2009, pp. 1-6.

(Continued)

*Primary Examiner* — Richard Torrente
*Assistant Examiner* — Richard Carter
(74) *Attorney, Agent, or Firm* — Brian J. Dorini; Xiaoan Lu

(57) ABSTRACT

Accuracy and efficiency of video quality measurement are major problems to be solved. According to the invention, a method for accurately predicting video quality uses a rational function of the quantization parameter QP, which is corrected by a correction function that depends on content unpredictability CU. Exemplarily, the correction function is a power function of the CU. Both QP and CU can be computed from the video elementary stream, without full decoding the video. This ensures high efficiency.

15 Claims, 4 Drawing Sheets

(56) References Cited

U.S. PATENT DOCUMENTS

| | | | |
|---|---|---|---|
| 2006/0104360 A1* | 5/2006 | Gordon | H04N 19/159 375/240.16 |
| 2008/0019669 A1* | 1/2008 | Girshick | G06F 17/30793 386/224 |
| 2008/0175503 A1 | 7/2008 | Bichlmaier et al. | |
| 2008/0198928 A1 | 8/2008 | Fujisawa et al. | |
| 2008/0317111 A1 | 12/2008 | Davis | |
| 2010/0110199 A1 | 5/2010 | Winkler et al. | |
| 2010/0316131 A1 | 12/2010 | Shanableh et al. | |
| 2011/0013694 A1* | 1/2011 | Watanabe | H04N 17/004 375/240.12 |
| 2011/0102601 A1 | 5/2011 | Davis | |
| 2011/0228859 A1* | 9/2011 | Sugimoto | H04N 19/159 375/240.27 |
| 2013/0016224 A1* | 1/2013 | Davis | H04N 17/004 348/192 |

FOREIGN PATENT DOCUMENTS

| | | |
|---|---|---|
| EP | 2144449 | 1/2010 |
| JP | 2010011112 | 1/2010 |
| RU | 2420022 | 5/2011 |
| WO | WO03101121 A1 | 12/2003 |
| WO | WO2004054274 | 6/2004 |
| WO | WO2008048155 | 4/2008 |
| WO | WO2008139351 | 11/2008 |
| WO | WO2011043793 A1 | 4/2011 |

OTHER PUBLICATIONS

Yang et al., "Coding distortion assessment for streaming video", 5th International Conference on Visual Information Engineering, VIE 2008, Jul. 29, 2008-Aug. 1, 2008, pp. 819-823.

F. Yang et al:"No-reference quality assessment for networked video via primary analysis of bit stream",IEEE Trans.Circuits Video Tech., Nov. 2010,vol. 20 , No. 11, pp. 1544-1554.

M.N. Garcia et al: "Towards a content-based parametric video quality model for IPTV", In VPQM, 2010, pp 1-5.

K. Yamagishi et al: "Hybrid video-quality-estimation model for IPTV services", GLOBECOM, 2009, pp. 1-5.

Search Report dated Sep. 27, 2012.

Li et al., "Image Quality Assessment by separately evaluating detail losses and addative impairments", IEEE Transactions on multimedia, vol. 13, No. 5, pp. 935-949.

Kwon et al.: Efficient Rate Control for the First Frame in H.264/AVC. Proceedings of the 2008 International Conference on Image Processing, Computer Vision & Pattern Recognition. IPCV 2008, Jul. 14-17, 2008, pp. 155-159.

Lee et Al: "Real-Time Objective Quality Assessment Based on Coding Parameters Extracted From H.264 AVC Bitstream" Dept. of Comput. Eng., Kwangwoon Univ., Seoul IEEE Transactions on Consumer Electronics, May 2010, pp. 1071-4078.

* cited by examiner

METHOD AND APPARATUS FOR VIDEO QUALITY MEASUREMENT

This application claims the benefit, under 35 U.S.C. § 365 of International Application PCT/CN2011/002096, filed Dec. 15, 2011, which was published in accordance with PCT Article 21(2) on Jun. 20, 2013 in English.

FIELD OF THE INVENTION

This invention relates to video quality measurement, in particular with the assessment of a compressed video without reference to a copy of the original uncompressed video.

BACKGROUND

In IPTV (Internet protocol television), video programs have different format stages during their life circle. A video encoder compresses the video program to a bit stream, also referred to as an elementary stream (ES). The ES is further packetized into a transport stream (TS) and finally transmitted in an IP channel. Video quality can be measured using data that are obtained by accessing the transport stream, elementary stream or decoded video. Among the three types of measurement, using the transport stream is generally the fastest but the least accurate, since it has the smallest amount of video data available; using the decoded video is often accurate but the slowest, since decoding the video is computationally expensive; using the elementary stream can achieve a tradeoff between the accuracy and the computational complexity. Currently, particularly video quality measurement based on the elementary stream is being investigated.

Video compression generally employs quantization techniques. Quantization is a lossy compression technique by means of limiting the precision of signal values. It is well known that quantization is a significant factor to artifact visibility, and the quantization parameter (QP) is a powerful predictor to the video quality. Various functions of video quality with respect to QP have been provided in the literature, such as linear function [1, 2] and exponential function [3]. However, they are insufficiently accurate for the relatively large and/or the relatively small QP level, and thus their results are not satisfactory for low-bandwidth or high-fidelity applications.

The content complexity is another critical factor for video quality measurement (VQM). Visual artifacts in complex videos are more likely to be tolerated by the human eye, and thus show better quality. Therefore, content complexity in combination with QP can improve the accuracy of quality measurement, compared to using the QP alone.

Traditionally, as in [4], content complexity may be quantified as the variance, the gradient, or the edge filter response of pixel values, or their combinations. The traditional methods have at least the following disadvantages.

First, such features are not tightly correlated with human visual perception. A video with large content complexity may have not only rich texture and irregular motion, but also many edges and/or regular motion. For human eyes, visual artifacts are more likely to be tolerated in texture and irregularly (i.e., stochastically) moving regions, but ordinarily more attractive and visible in edges or regularly (i.e., constantly) moving regions. Second, such features can hardly be computed until the pixels are recovered after full decoding. Thus, the traditional complexity measurement is computational expensive since it requires full decoding of the video.

SUMMARY OF THE INVENTION

The present invention solves at least the problem of improving accuracy and/or efficiency of video quality measurement. According to the invention, the method for accurately predicting video quality uses a rational function of the QP, which is corrected by a correction function that depends on content unpredictability (CU). In various embodiments, the correction function is a power function of the CU. Both QP and CU can be computed from the video elementary stream, without fully decoding the video. Advantageously, this ensures high efficiency.

A first advantage of the invention is high accuracy of video quality prediction, which is confirmed by subjective experiments conforming to ITU-T SG 12 [5] as well as statistical verifications. The accuracy is ensured by at least two features.

One is calculating an average QP and using a rational function of the average QP for predicting a basic impairment due to quantization. This function can capture the effect of quality saturation at both the relatively large and the relatively small QP levels, and thus provides a sufficiently accurate result. The other feature is using a power function of CU to correct the QP-based prediction, which improves the prediction accuracy further.

Specifically, the CU, as a video feature, can discriminate irregular changes from regular changes and from "no change" in a video signal. Consequently, the CU is more powerful to capture the influence of content features on perceived quality. The invention also provides a fast algorithm to estimate the CU from the video elementary stream, which results in a second advantage.

The second advantage is that the method requires only the elementary stream of a video instead of fully decoded video, and thus is computationally less expensive than known methods.

With the accuracy and low computational cost, the VQM can be deployed e.g. in user terminals, set-top boxes, home gateways, routers, or video streaming servers, so as to monitor the video quality and provide feedback for service planning.

The present invention, in one aspect, concerns a method for estimating video quality of an encoded video stream that comprises macroblock prediction residuals, wherein the method comprises a step of calculating, for a video sequence comprising a plurality of frames, an overall quality score Q from a basic quality score Qb multiplied by a correction factor Qc, wherein the basic quality score Qb is obtained from an average quantization parameter $\overline{QP}$ over the frames of the video sequence, and wherein the correction factor Qc is obtained from an average pixel variance within the prediction residuals of macroblocks in the video sequence.

In one aspect, the invention concerns an apparatus for estimating video quality of an encoded video stream that comprises macroblock prediction residuals, the apparatus comprising a processing element for calculating, for a video sequence comprising a plurality of frames, an overall quality score Q from a basic quality score Qb multiplied by a correction factor Qc, wherein the basic quality score Qb is obtained from an average quantization parameter value over the frames of the video sequence, and wherein the correction factor Qc is obtained from an average pixel variance within the prediction residuals of macroblocks in the video sequence.

In various embodiments, the apparatus comprises one or more of the following:

a quantization parameter parser for detecting and averaging the quantization parameters of the macroblocks (MBs), wherein the quantization parameter parser provides the quantization parameter of the MBs and said average quantization parameter value;

a DCT coefficients parser for detecting and extracting the DCT coefficients of the MBs;

a Content Unpredictability calculator for calculating, according to the DCT coefficients of the MBs and the quantization parameter of the MBs, a first value $CU_l$ that represents a local Content Unpredictability and a second value $CU_g$ that represents a global Content Unpredictability, wherein the second value is calculated by averaging the first values;

a de-packetizer for de-packetizing (or de-packing) the Transport Stream, wherein an Elementary Stream (ES) is obtained, and a selective entropy decoder for decoding at least portions of the ES.

In one aspect, the invention relates to a computer readable medium having executable instructions stored thereon to cause a computer to perform a method comprising a step of calculating, for a video sequence comprising a plurality of frames, an overall quality score Q from a basic quality score Qb multiplied by a correction factor Qc, wherein the basic quality score Qb is obtained from an average quantization parameter $\overline{QP}$ over the frames of the video sequence, and wherein the correction factor Qc is obtained from an average pixel variance within the prediction residuals of macroblocks in the video sequence.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a video quality measurement tool.

DETAILED DESCRIPTION OF THE INVENTION

Figure 1:
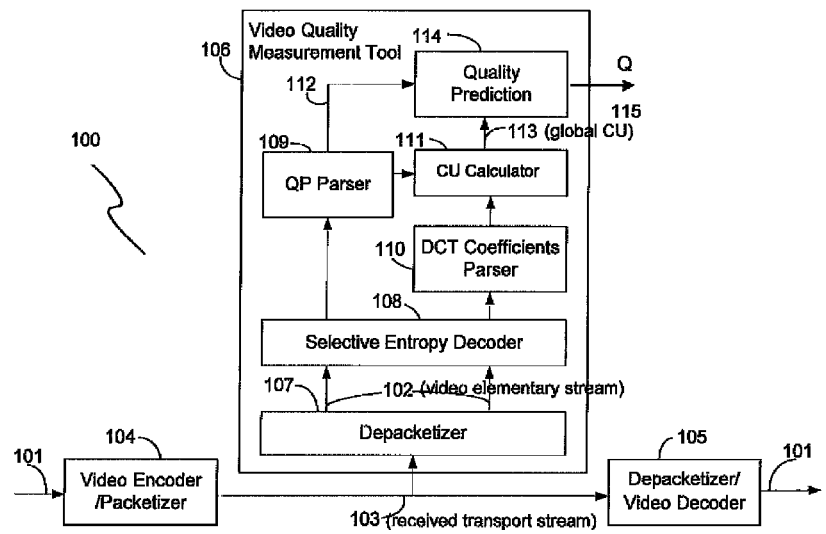

In one embodiment of the invention, FIG. 1 shows the structure of a video quality measurement (VQM) tool 106 within a video transmission system 100. Typical format stages 101,102,103 of a video program are as follows: a video encoder 104 compresses the video programs 101 to a bit stream, also referred to as an elementary stream (ES) (in FIG. 1 exemplarily only within video encoder 104, therefore not shown). The ES is further packetized into a transport stream (TS) 103 and then transmitted in a transmission channel, e.g. an IP channel. The VQM tool 106, in principle, de-packetizes the video TS 103, thus obtaining the video ES, then parses and averages the QP and obtains a content unpredictability CU value from the obtained video ES, and finally predicts the video quality Q from the QP and the CU value. More details are given below. Advantageously, this process is fast and does not require fully decoding the video.

The video quality is predicted by a function that is a multiplication of two sub-functions. The value of a first sub-function determines the basic impairment due to quantization, i.e. a basic quality score. In one embodiment, the first sub-function is a rational function of the QP. Specifically, its denominator is polynomial about the average QP of the video, while its numerator is the denominator lessened by a constant (e.g. 1). The second sub-function is a correction factor, and its value quantifies the influence of content unpredictability (CU) on the perceived quality. Preferably, the second sub-function is a power function about the CU of the video, as further specified below.

CU is a value associated with a video, and advantageously can be computed from the video ES as described below, specifically by using the quantized DCT coefficients of the video. The CU of a video reflects the intrinsic features of the content, i.e. provides a value that characterizes the content. Thus, it can be used for determining the content's impact on the perceived video quality.

In one embodiment, QPs and quantized DCT coefficients are recovered after selective entropy decoding in a selective entropy decoding module 108. Full decoding of the video, which would include complete run-length decoding, de-quantization, inverse discrete cosine transform (IDCT) and residual compensation, is generally not required.

The video quality prediction of the present invention is of the "no-reference" NR (or non-intrusive) type. That is, it does not need to access a copy of the original uncompressed video. Further, there is no need for the quality prediction of the present invention to fully decode the video. In one embodiment, the prediction uses data that can directly be extracted from a video elementary stream.

In the following, the workflow of the video quality measurement (VQM) tool 106 shown in FIG. 1 is described in detail.

The input of the VQM tool 106 may be a transport stream 103, which may be generated by a video encoder and packetizer 104 from video programs 101. The video encoder and packetizer 104 may but needs not be part of the invention. In another embodiment, a video ES 102 comprising encoded video programs 101 is directly input to the VQM tool 106. The output 115 of the VQM tool 106 is a predicted quality score Q associated with the input video.

Within the tool 106, in an embodiment capable of processing transport streams, first a depacketizer 107 parses the received transport stream 103 to obtain the video elementary stream 102. Second, video features including the average QP 112 and the global CU 113 are obtained by selective entropy decoding in a selective entropy decoder 108, parsing the selectively entropy decoded data in a QP parser 109 and a DCT coefficients parser 110, wherein the QP parser 109 provides the average QP 112, and calculating the global CU in a CU calculator 111. Finally, a quality predictor module 114 determines a quality score Q according to the video features via a predetermined measurement function.

Specifically, the video features are obtained from the output of the selective entropy decoder 108 by two simultaneously executing function blocks, or threads. In one thread, the QP parser 109 picks up (i.e. extracts) the QPs of each MB and provides the QPs to the CU calculator 111. Further, the QP parser 109 averages the QPs over a plurality of MBs and outputs the resulting average value 112. In the other thread, first the DCT coefficients parser 110 picks up (i.e. extracts) the DCT coefficients of each MB, and then the CU calculator 111 calculates the local CU according to the DCT coefficients from the DCT coefficients parser 110 and the corresponding QP from the QP parser 109. Finally, the CU calculator 111 averages the local CUs and outputs the global CU 113 obtained by averaging all local CUs.

In the following, a holistic view of the measurement function is described.

The measurement function works in the quality estimator module 114 according to a mathematical model that depicts the video quality against at least two video features, including the average QP 112 and the global CU 113. In one embodiment, the measurement function is defined as:

$$Q = Q_b \times q_3 \qquad (1)$$

where $Q_b$ is the basic quality level due to quantization, $Q_c$ is an item to correct $Q_b$ according to the Content Unpredictability of the video, and Q is the final predicted quality.

In embodiments, the basic quality level due to quantization $Q_b$ and the correction factor $Q_c$ for correcting the basic quality level $Q_b$ according to the CU are calculated according to $$Q_b = \frac{a_2 \times (\overline{QP} - a_3)^{a_1}}{1 + a_2 \times (\overline{QP} - a_3)^{a_1}} \qquad (2)$$

$$Q_c = b_2 \times CU_g^{b_1} + b_3 \qquad (3)$$

where $\overline{QP}$ is the average QP value, $CU_g$ is the global CU value, and $a_1$, $a_2$, $a_3$, $b_1$, $b_2$ and $b_3$ are predetermined parameters.

Preferably, the predetermined parameters are positive, rational and selected from the following ranges:

$2 \leq a_1 \leq 6$; a particularly advantageous value is $a_1 = 4$.

$10^{-5} \leq a_2 \leq 10^{-4}$; a particularly advantageous value is $a_2 = 0.00005$ ($5 \cdot 10^{-5}$).

$30 \leq a_3 \leq 75$; a particularly advantageous value is $a_3 = 49$.

$0.1 \leq b_1 \leq 0.3$; a particularly advantageous value is $b_1 = 0.2$ $0.1 \leq b_2 \leq 0.3$; a particularly advantageous value is $b_2 = 0.18$ and $1 \leq b_3 \leq 2$; a particularly advantageous value is $b_3 = 1.65$.

Figure 2:
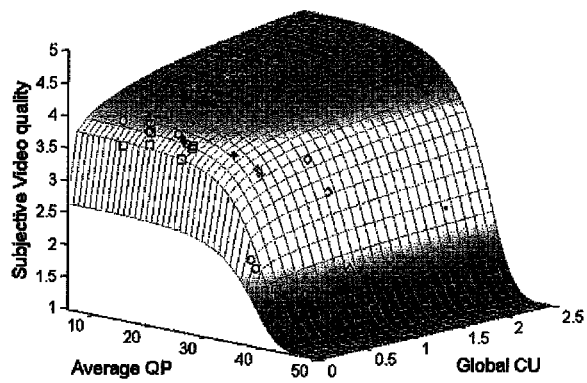
FIGS. 2-4 different views of fitting a subjective quality with the measurement function.
Figure 3:
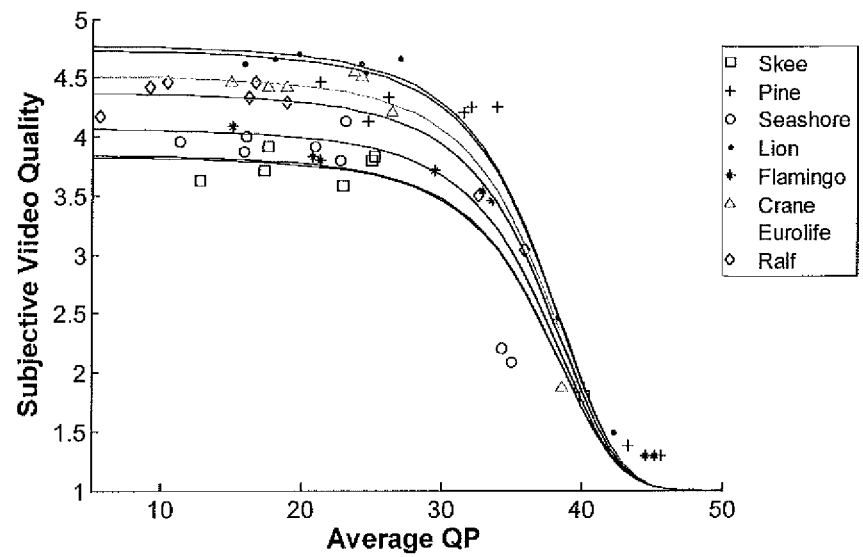
Figure 4:
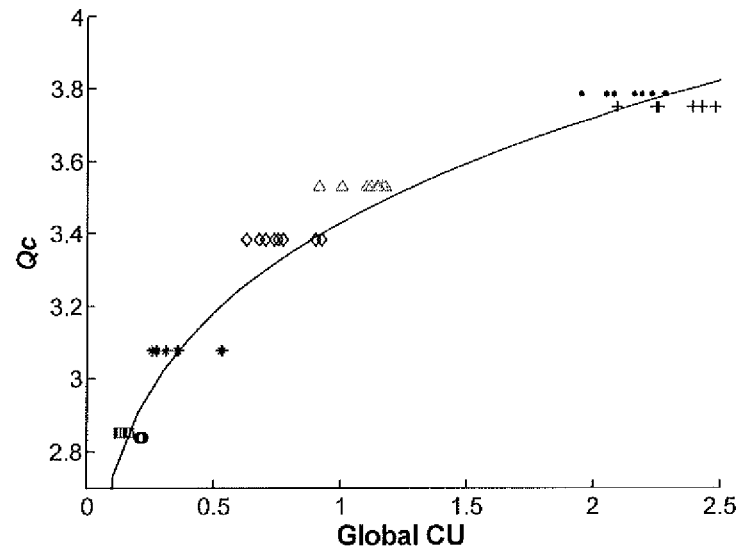

High accuracy of the measurement function is confirmed by experimental results as shown in FIGS. 2-4, which shows for exemplary video sequences different views of fitting a subjective quality with the measurement function. FIG. 2 shows a holistic view. In particular, FIGS. 2-4 depict fitting the subjective quality scores against the average QP and the global CU. Each point corresponds to one of the 64 videos from a subjective database. The 64 (=8×8) videos are generated by compressing eight different original videos at eight different compression ratios.

The compressed videos from different original videos are marked by different markers, as illustrated by the legend in FIG. 3. Subjective quality is rated by 24 reliable subjects during a subjective experiment conforming to ITU-T SG 12 [5]. The average QP and the global CU are of the corresponding video are rated.

FIG. 2 shows how the predicted quality scores match with the subjective quality scores via the measurement function according to Eq. (1-3), which in this view forms a surface. FIG. 3 shows a left side view, and FIG. 4 a right side view of the surface (sectional drawings). The experimental result of the correlation between the predicted quality scores and the subjective scores confirms that the measurement function can accurately predict the video quality.

Average QP

For H.264, as also for other compression standards, each macroblock (MB) has a QP. The QP indexes a predefined table of the quantization step QSTEP, which is the linear quantizer used for quantizing the DCT coefficients inside a current MB. The average QP 112 is the mean or average QPs among all the MBs.

Basic Impairment by Quantization

Figure 5:
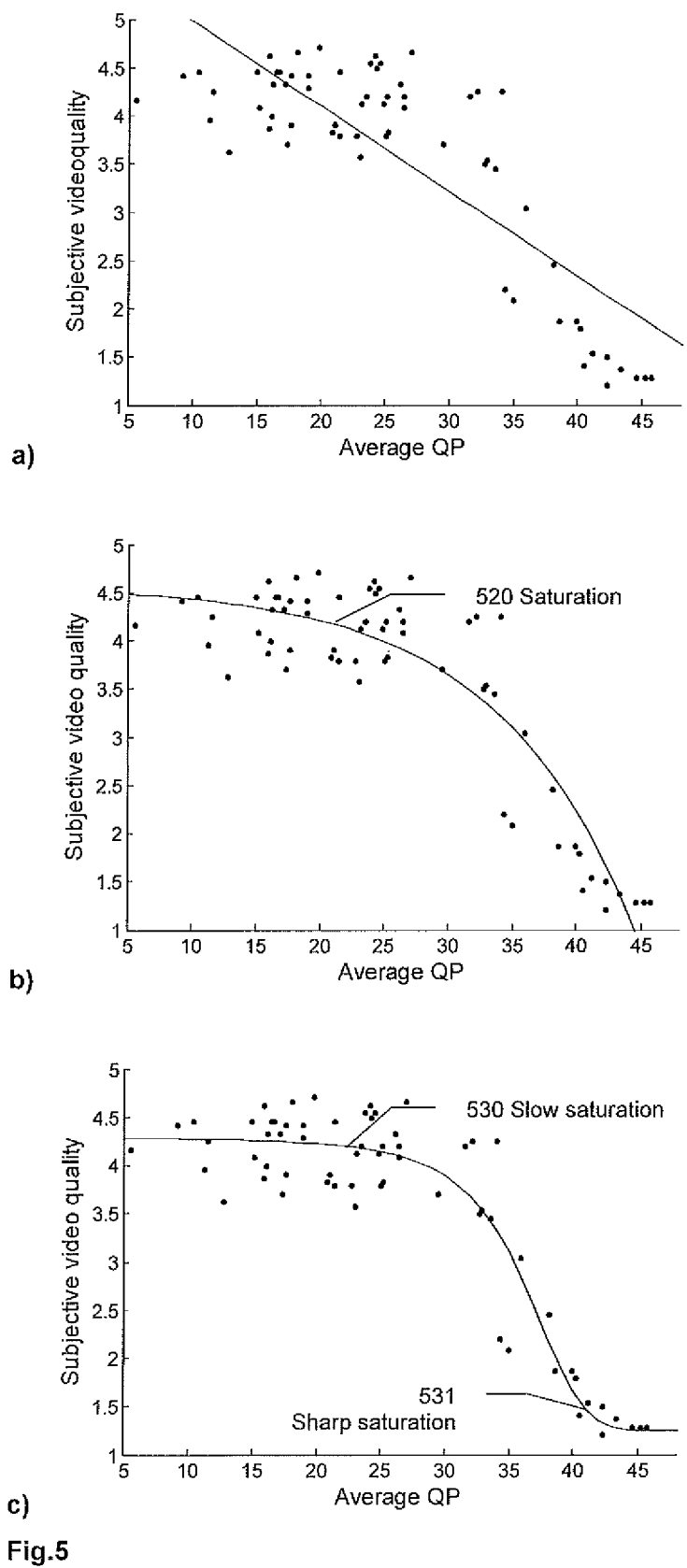
FIG. 5 fitting basic impairment with different functions of the QP.

A difference between the QP-based function of the invention and existing solutions is illustrated in FIG. 5, which shows fitting (i.e. mapping) the basic impairment (i.e. left side view as in FIG. 3) to different functions of the average QP. Note that FIG. 5 shows the subjective quality against the average QP alone. In FIG. 5 *a*), fitting the basic impairment with a linear function is depicted. In FIG. 5 *b*), fitting the basic impairment with an exponential function is depicted. In FIG. 5 *c*), fitting the basic impairment with a rational function is depicted. Each compressed video is depicted as a point. FIG. 5 shows fitting the points (quality against QP) in FIG. 5 *a*) with a linear function, as in [1,2], in FIG. 5 *b*) with an exponential function, as in [3], and in FIG. 5 *c*) with a rational function as in Eq. (2), according to the present invention. Regression analysis shows that the rational function is closest to the position of the points. In other words, the mapping the quality to a rational function according to the invention is a better solution than to an exponential or linear function, since it can, firstly, match the quality saturation trends at small QP levels and at large QP levels, and secondly, capture the slow saturation (large turn) at the small QP levels but also the sharp saturation (steep turn) at the large QP levels.

Content Unpredictability

Different from the existing solutions based on content complexity, the present invention uses content unpredictability (CU) to discriminate irregular changes from regular changes or no changes in a video signal. Traditional content complexity is computed with the pixel information of a video, while CU is computed with the residual information of a video. For the present invention, the local CU is defined as the pixel variance of (intra- or inter-) prediction residuals of the macroblocks, and the global CU is defined as the average of the local CUs of several or all macroblocks in the video. Inter prediction (in H.264, H.263, H.261, MPEG-4, MPEG-2, etc.) and intra prediction (in K264, MPEG-4, etc.) are compression techniques that exploit in a video predictability that results from redundancy. Prediction residuals usually preserve the irregularity information, which can hardly be predicted from the temporal-spatial neighborhood. Therefore, in the invention, the variance of residuals is a suitable indicator of content unpredictability.

Known solutions, even if they are aware of the importance of CU, like [2], yet estimate CU according to the bit rate of video. However, bit rate is affected by many factors (e.g. DCT coefficient distribution, motion vector, etc.). Thus, estimating CU by bit rate suffers from the interference of many factors that are unrelated to CU. It is therefore an advantage of the present invention that CU is predicted as defined above, and not just according to the bit rate. Further, different from the content complexity being computed after full decoding, CU can be fast computed from data inside the ES, without full video decoding.

In one embodiment, the variance of a residual MB is approximated by the variance and the mean (average) of the blocks of the MB. Block variance is theoretically equal to the Euclidean norm of all de-quantized AC coefficients. Local CU is proportional to the Euclidean norm of quantized AC coefficients plus a weighted variance of DC coefficients, where the weight is to balance the different scale factor in 4×4 and 8×8 IDCT (integer discrete cosine transform). To further approximate local CU, the quantization is compensated according to the QP in the present invention.

For a residual macroblock with 4×4 transform blocks, the local CU is defined as $$CU_l = 2^{QP/c_1} \times \left[ \sum_{j=1}^{16} \sum_{i=1}^{15} AC_{ij}^2 + c_2 \times \sum_{j=1}^{16} \left( DC_j - \sum_{j=1}^{16} DC_j/16 \right)^2 \right] \quad (4)$$

For a residual macroblock with 8×8 transform blocks, the local CU is defined as $$CU_l = 2^{QP/c_1} \times \left[ \sum_{j=1}^{4} \sum_{i=1}^{63} AC_{ij}^2 + c_3 \times \sum_{j=1}^{4} \left( DC_j - \sum_{j=1}^{4} DC_j/4 \right)^2 \right] \quad (5)$$

where QP is the QP value of the current macroblock, $AC_{ij}$ is the $i^{th}$ AC coefficient value of the $j^{th}$ block inside the current macroblock, $DC_j$ is the DC coefficient value of the $j^{th}$ block inside the current macroblock, constant $c_1$ is associated with QSTEP scaling and $2^{QP/c_1}$ is to compensate quantization. The constants $c_2$ and $c_3$ are for balancing the scale factor in 4×4 and 8×8 transform respectively. Finally, the global CU is the average local CUs among all MBs. Exemplary parameters for calculating $CU_l$ are $c_1=3$, $c_2=15$, $c_3=3$.

Perceived Quality Corrected by CU

An advantage of introducing CU in the VQM is that the quality as predicted by the QP alone is corrected, and therefore improved, which leads to higher accuracy of the VQM. This is confirmed by the experimental results shown in FIG. 3 and FIG. 5c). Fitting every eight compressed videos corresponding to the same original video with different rational function curves in FIG. 3 is more accurate than fitting the total of 64 compressed videos with a unique rational function curve in FIG. 5c). Moreover, the eight rational function curves are similar to each other and only differ at their amplitudes. The amplitude can be predicted by a power function of the global CU, as shown in FIG. 3 (i.e. the right side view of FIG. 2). The power function is defined by Eq. (3).

Although the VQM tool 106 and the exact measurement function of Eq. (1-3) can ensure maximum accuracy, the invention may in one embodiment contain the QP-based prediction alone and provide fairly good accuracy and lower computational cost than known solutions.

The embodiment may comprise at least the QP parser 109 and quality prediction module 114, i.e. without the DCT coefficient parser 110 and CU calculator 111. As mentioned above, the VQM tool may in one embodiment also comprise the depacketizer 107 and the selective entropy decoder 108. The selective entropy decoder 108 may handle the QPs only in I-frames of video, but ignore the QPs in P and B frames. The quality prediction module 114 executes only Eq. (2) to determine the final video quality.

Figure 6:
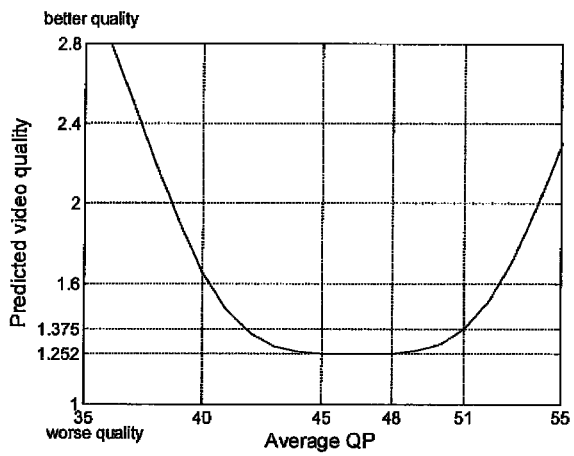
FIG. 6 improved quality prediction according to the invention especially at a large QP level.

FIG. 6 shows a diagram that illustrates the improved quality prediction, according to the invention, particularly at large QP levels. Although the method according to the invention can predict video quality accurately for normal videos, it may output unique results for certain special input. E.g., given a compressed video with a constant QP of 45, if the QP is set to be 51 or larger, a better quality score is achieved. This effect is advantageous since higher QP means higher compression, and it is achieved because of the following two reasons.

First, traditional QP-based methods often use a monotonic function with respect to QP, and a larger QP always leads to a worse quality score, i.e. QP of 51 should usually be worse than QP of 45.

Second, the rational function Eq. (2) monotonically decreases with the QP when the QP is smaller than 46, but increases with the QP when the QP is larger than 46. This is shown in FIG. 6. That is, a QP of e.g. 51 is better than a QP of e.g. 45.

Further, the following effect is achieved. Given a compressed video, when the largest AC coefficient in each transform block is increased by 1, then a better quality is achieved. This is because, first, such modification acts like a video watermark, i.e. it almost does not change both the frequently-used features (e.g. QP, bit rate) in the elementary stream and the decoded video, except for increasing the Euclidean norm of AC coefficients and hence $CU_g$. Second, the method of the invention can detect the quality change, since it uses the high-order moments (including variance) of AC coefficients. Third, the method of the invention will predict a better quality since $CU_g$ (and hence $Q_2$) increases.

Figure 7:
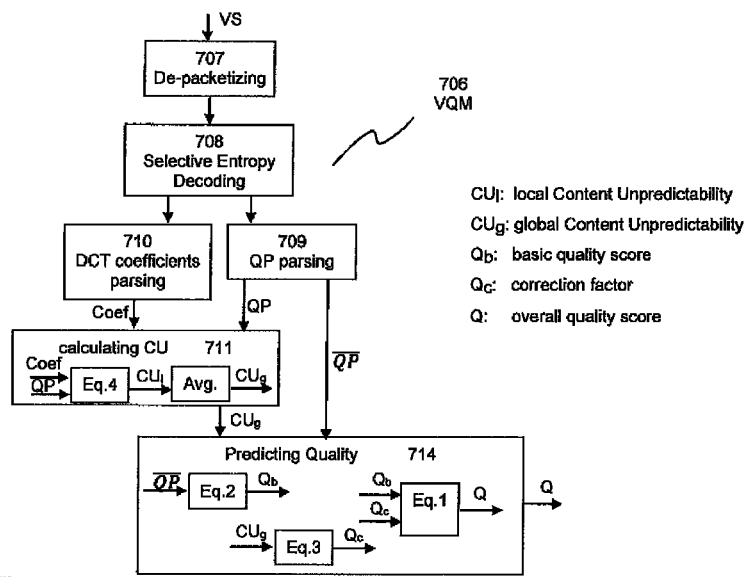
FIG. 7 a flow chart of video quality measurement.

FIG. 7 shows a flow chart of a video quality measurement method 706. It is a method for estimating video quality of an encoded video stream, wherein the encoded video stream comprises MB prediction residuals, and comprises at least a step of calculating 714, for a video sequence VS comprising one or more frames, an overall quality score Q from a basic quality score Qb multiplied by a correction factor Qc, wherein the basic quality score Qb is obtained from an average quantization parameter $\overline{QP}$ over the frames of the video sequence, and wherein the correction factor Qc is obtained from an average pixel variance $CU_l$ within the prediction residuals of macroblocks in the video sequence. In one embodiment, the method comprises one or more of a de-packetizing step 707, a selective entropy decoding step 708, a QP parsing step 709, a DCT coefficients parsing step 710, a step for calculating 711 the local CU and the global CU, and a video quality prediction step 714.

In one embodiment, the method further comprises in the QP parsing step 709 also a step of averaging the QPs within a MB for determining an average QP, denoted as $\overline{QP}$.

In one embodiment, the method further comprises steps of calculating, according to the DCT coefficients and the quantization parameter of each MB, a first value $CU_l$ that represents a local Content Unpredictability and a second value $CU_g$ that represents a global Content Unpredictability, wherein the second value is calculated by averaging Avg the first values. The first value is the pixel variance of the prediction residuals.

The invention can be used for video quality assessment, perceptual video coding, planning on video streaming, etc. In principle, the video quality prediction is applicable to videos that have been compressed by DCT plus quantization. One embodiment is designed for the video compressed according to the H.264 standard. In other embodiments, the invention relates to other codecs, such as H.261, H.263, MPEG-2, MPEG-4 etc.

In an embodiment, the invention relates to a no-reference, ES-based video quality measurement tool. The tool, or a corresponding method, can operate in user terminals, set-top boxes, home gateways, routers, or video streaming servers, using the QP and the quantized DCT (discrete cosine transform) coefficients. CU is computed according to the DCT coefficients and the QP. The video quality is then computed from a function about the QP and CU. In one embodiment, the parameters of the function are predetermined by multiple regression analysis on the subjective database which is specially built conforming to ITU-T SG 12.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

CITED REFERENCES

[1] A. G. Davis, "Video quality measurement." U.S. Patent application, publication No. US 2008/0317111 A1 published Dec. 25, 2008.
[2] F. Yang, S. Wan, Q, Xie et. al., "No-reference quality assessment for networked video via primary analysis of bit stream." *IEEE Trans. Circuits Syst. Video Technol.* vol. 20, no. 11, pp. 1544-1554, November 2010.
[3] M. N. Garcia, R. Schleicher, A. Raake, "Towards a content-based parametric video quality model for IPTV", in *VPQM*, 2010.
[4] K. Yamagishi, T. Kawano, and T. Hayashi, "Hybrid video-quality-estimation model for IPTV services." in *GLOBECOM*, 2009.
[5] ITU TD 469-GEN, "P.NAMS Test Plan", http://www.itu.int/md/T09-SG12-110118-TD-GEN-0469/en, January 2011

The invention claimed is:

1. A method for estimating video quality of an encoded video stream, the encoded video stream comprising macroblock prediction residuals, wherein the method is performed by and configured to be executed on a video quality measurement processor, the method comprising:
performing quantization parameter (QP) parsing and averaging QPs within a macroblock for determining an average quantization parameter, $\overline{QP}$, of frames of a video sequence;
calculating, for the video sequence comprising a plurality of frames, an overall quality score Q from a basic quality score Qb multiplied by a correction factor Qc,
wherein the basic quality score Qb is obtained from the average quantization parameter $\overline{QP}$ of the frames of the video sequence, and wherein the correction factor Qc is obtained from an average pixel variance within the prediction residuals of macroblocks in the video sequence, and wherein the method further comprises:
determining said basic quality score Qb according to a function of a form $x_b/(1+x_b)$, where in $x_b$ is a parameter depending on said average quantization parameter $\overline{QP}$; and
determining said correction factor Qc according to a rational function of a form $b_2 \cdot x_c + b_3$, with $b_2$, $b_3$ being constants and $x_c$ being a power function of said average pixel variance within the prediction residuals.

2. The method according to claim 1, further comprising calculating, according to the DCT coefficients and the quantization parameter of the macroblocks, a first value $CU_l$ that represents a local Content Unpredictability, the first value being a pixel variance of the prediction residuals, and a second value $CU_g$ that represents a global Content Unpredictability, wherein the second value is calculated by averaging the first values.

3. The method according to claim 1, with $x_b = a_2 \cdot (\overline{QP} - a_3)^{a_1}$ for said basic quality score Qb, wherein $a_1$, $a_2$, $a_3$ are positive rational parameters.

4. The method according to claim 3, wherein the positive parameters are within the following ranges:
$2 < a_1 < 6$
$10^{-5} < a_2 < 10^{-4}$
$30 < a_3 < 75$.

5. The method according to claim 1, with $x_c = (CU_g)^{b_1}$ for said correction factor Qc, wherein $b_1$, $b_2$, $b_3$ are positive parameters.

6. The method according to claim 5, wherein the parameters are within the following ranges:
$0.1 < b_1 < 0.3$
$0.1 < b_2 < 0.3$ and
$1 < b_3 < 2$.

7. The method according to claim 1, wherein the method operates on a Transport Stream level, further comprising:
parsing and depacketizing the Transport Stream, wherein an Elementary Stream is obtained, and
decoding at least portions of the Elementary Stream by a selective entropy decoder for obtaining said quantization parameters and pixel values.

8. An apparatus for estimating video quality of an encoded video stream, the encoded video stream comprising macroblock prediction residuals, the apparatus comprising:
a processing element for
detecting and averaging quantization parameters of macroblocks for determining an average QP, $\overline{QP}$, of frames of a video sequence;
providing the quantization parameters of the macroblocks and said average quantization parameter value;
calculating, for the video sequence comprising a plurality of frames, an overall quality score Q from a basic quality score Qb multiplied by a correction factor Qc,
wherein the basic quality score Qb is obtained from the average quantization parameter value over the frames of the video sequence, and wherein the correction factor Qc is obtained from an average pixel variance within the prediction residuals of macroblocks in the video sequence, and
wherein said basic quality score Qb is determined according to a function of a form $x_b/(1+x_b)$, wherein $x_b$ is a parameter depending on said average quantization parameter $\overline{QP}$; and
said correction factor Qc is determined according to a rational function of a form $b_2 \cdot x_c + b_3$, with $b_2$, $b_3$ being constants and $x_c$ being a power function of said average pixel variance within the prediction residuals.

9. The apparatus according to claim 8, further comprising a DCT coefficients parser for detecting and extracting the DCT coefficients of the macroblocks.

10. The apparatus according to claim 8, further comprising a Content Unpredictability calculator for calculating, according to the DCT coefficients of the macroblocks and the quantization parameters of the macroblocks, a first value $CU_l$ that represents a local Content Unpredictability and a second value $CU_g$ that represents a global Content Unpredictability, wherein the second value is calculated by averaging the first values.

11. The apparatus according to claim 8, wherein the apparatus operates on Transport Stream level, further comprising a depacketizer for de-packetizing the Transport Stream, wherein an Elementary Stream is obtained, and a selective entropy decoder for decoding at least portions of the Elementary Stream.

12. The apparatus according to claim 8, with $x_b = a_2 \cdot (\overline{QP} - a_3)^{a_1}$ for said basic quality score Qb, wherein $a_1$, $a_2$, $a_3$ are positive rational parameters.

13. The apparatus according to claim 12, wherein the positive parameters are within the following ranges:
$2 < a_1 < 6$
$10^{-5} < a_2 < 10^{-4}$
$30 < a_3 < 75$.

14. The apparatus according to claim 8, with $x_c = (CU_g)^{b_1}$ for said correction factor Qc, wherein $b_1$, $b_2$, $b_3$ are positive parameters.

15. The apparatus according to claim 14, wherein the parameters are within the following ranges:
$0.1 < b_1 < 0.3$
$0.1 < b_2 < 0.3$ and
$1 < b_3 < 2$.

* * * * *